United States Patent
Reime

(10) Patent No.: US 11,460,287 B2
(45) Date of Patent: Oct. 4, 2022

(54) INDUCTIVE ANALYSIS OF METAL OBJECTS

(71) Applicant: Gerd Reime, Bühl (DE)

(72) Inventor: Gerd Reime, Bühl (DE)

(*) Notice: Subject to any disclaimer, the term of this patent is extended or adjusted under 35 U.S.C. 154(b) by 0 days.

(21) Appl. No.: 17/259,744

(22) PCT Filed: Jul. 30, 2019

(86) PCT No.: PCT/EP2019/070494
§ 371 (c)(1),
(2) Date: Jan. 12, 2021

(87) PCT Pub. No.: WO2020/025608
PCT Pub. Date: Feb. 6, 2020

(65) Prior Publication Data
US 2021/0180936 A1 Jun. 17, 2021

(30) Foreign Application Priority Data

Jul. 30, 2018 (DE) .................. 10 2018 118 408.5
Aug. 27, 2018 (DE) .................. 10 2018 120 912.6

(51) Int. Cl.
*G01B 7/06* (2006.01)
*G01N 27/02* (2006.01)
*G01V 3/10* (2006.01)

(52) U.S. Cl.
CPC ............. *G01B 7/10* (2013.01); *G01N 27/023* (2013.01); *G01V 3/104* (2013.01)

(58) Field of Classification Search
CPC ........ G01B 7/10; G01N 27/023; G01N 27/90; G01N 27/045; G01V 3/104
(Continued)

(56) References Cited

U.S. PATENT DOCUMENTS 3,263,160 A * 7/1966 Dolan ............... G01V 3/104
324/336
4,110,679 A * 8/1978 Payne ............... G01V 3/107
324/329
(Continued)

FOREIGN PATENT DOCUMENTS

CA 2951848 A1 6/2017
DE 4339419 C2 5/1995
(Continued)

OTHER PUBLICATIONS

International Search Report for corresponding application PCT/EP2019/070494 filed Jul. 30, 2019; dated Nov. 11, 2019.

*Primary Examiner* — Christopher P McAndrew
(74) *Attorney, Agent, or Firm* — Cantor Colburn LLP

(57) ABSTRACT

The invention relates to a measuring arrangement and to a method for the inductive analysis of metal objects, comprising a coil arrangement having an excitation coil (1.1) that can be excited by means of an excitation current, and at least one receiver coil (1.2), said two coils being inductively coupled to one another. By means of an evaluation unit, an output signal (5.4) of the measuring arrangement is evaluated. Means for generating a ramp-shaped voltage signal of the excitation voltage (2.5) as a specification for a ramp-shaped current through the excitation coil are provided. A control device regulates the current at the base point of the excitation coil (1.1) such that a ramp-shaped excitation current is produced, which is modulated by the metal object (1.6), and which affects the change in the excitation voltage. Thus, an inductive analysis or detection method is provided, in which temperature influences on the coil system have no effect at all, and which, moreover, allows a spectral analysis of the inductive properties of the metal to be analyzed in a wide frequency range.

12 Claims, 3 Drawing Sheets

(58) Field of Classification Search
USPC .......................................................... 324/229
See application file for complete search history.

(56) References Cited

U.S. PATENT DOCUMENTS

| | | | | |
|---|---|---|---|---|
| 4,215,310 | A * | 7/1980 | Schwerer, III | G01R 33/12 324/225 |
| 4,344,034 | A * | 8/1982 | Randolph, Jr. | G01V 3/107 324/329 |
| 4,507,612 | A * | 3/1985 | Payne | G01V 3/105 324/329 |
| 4,613,815 | A * | 9/1986 | Christel, Jr. | G01V 3/107 324/243 |
| 4,646,015 | A * | 2/1987 | Phillips | G01R 33/04 324/253 |
| 7,123,016 | B2 * | 10/2006 | Larsen | G01V 3/104 324/232 |
| 7,701,337 | B2 * | 4/2010 | Westersten | G01V 3/105 340/552 |
| 2008/0150537 | A1 * | 6/2008 | Westersten | G01V 3/105 324/326 |
| 2010/0148781 | A1 * | 6/2010 | Candy | G01V 3/104 324/329 |

FOREIGN PATENT DOCUMENTS

| | | |
|---|---|---|
| DE | 19821462 A1 | 11/1999 |
| DE | 102012001202 A1 | 2/2013 |
| GB | 2225856 A | 6/1990 |

* cited by examiner

INDUCTIVE ANALYSIS OF METAL OBJECTS

CROSS REFERENCE TO RELATED APPLICATIONS

The present application relates to and claims the priority of German patent application 10 2018 118 408.5 filed on 30 Jul. 2018, and German patent application 10 2018 120 912.6 filed on 27 Aug. 2018, the disclosures of which are hereby expressly incorporated by reference into the subject matter of the present application in its entirety.

TECHNICAL FIELD

The disclosure relates to a measuring arrangement and to a method for the analysis of metal objects.

Definitions

When, in the context of this application, the "inductive properties" of a coil are mentioned, this refers to the influence on energy output, and in particular on the phase and/or amplitude of the signal received at the receiver coil.

In the context of this application, "high impedance" means that an output signal of the receiver coil is detected at such a high impedance that changes in the resistance of the wire as a result of temperature have no influence, or at most a negligible influence, on the output signal to be evaluated.

BACKGROUND

Inductive sensors for the analysis of metal objects use a coil to generate an alternating magnetic field that penetrates the metal to be examined. On the basis of the effect on the field, it is possible to infer for example the type of metal, or a spacing between the coil and a metal. This last is used for example in film thickness measurement, in which the thickness of a coating film that is not affected by induction, between the metal and the coil, is determined.

The coil for generating the alternating magnetic field may be controlled using a square or sinusoidal signal of any desired frequency, and be configured in the most diverse ways. For example, conventional metal detectors often make use of "uncoupled coils". In these, a coil (exciter coil) is controlled using an alternating current, and supplies an alternating magnetic field. A second coil (receiver coil) is mechanically arranged such that the rising and falling field lines of the exciter coil are alternately cancelled in the receiver coil and thus this coil does not supply an output signal (in the absence of any influence from metal). Only once there is influence from metal does the symmetry of the field lines shift, and a corresponding electrical signal can be detected at the receiver coil. This is known, for example from DE 43 39 419 C2, as the "double D" method. However, this measuring method has the disadvantage that the exciter coil and the receiver coil do not have a common axis of symmetry.

US 2008/0150537 A1, which forms the basis of the preamble of the independent claims, discloses a metal detector of the pulse induction type, which is able to distinguish between metal objects and minerals that imitate metals as a result of their absorption and release of energy. During a first measurement interval, the object to be measured is influenced by a ramping-up magnetic field that can still exert an effect in the object to be measured during the succeeding, second measurement, and so influences the measurement values of the second measurement. The quantity of energy remaining in the object is measured by comparing the signals that are generated during particular intervals of a coil excitation pulse sequence that includes bipolar current ramps inducing identical signals in metal targets but differing signals in magnetic minerals. However, the metal detector does not serve to precisely analyze metal objects. Depending on predetermined criteria and voltage amplitude controls, the output signal is set to zero by a microcontroller and a DAC. There is no closed-loop control at the feed point of the exciter coil.

DE 10 2012 001 202 A1 discloses a sensor for locating metal objects using inductively coupled coils that, for the purpose of decoupling interaction, are arranged partly overlapping. In this arrangement, the exciter coil and the receiver coil have a substantially identical coil shape and are arranged twisted and/or offset in relation to one another, wherein a plurality of symmetrical overlapping regions are formed. Moreover, mutually overlapping meandering portions are provided. Despite the exciter coil and the receiver coil being completely decoupled, the method operates with a common axis of symmetry for the two coil systems.

Other methods use two coils, preferably connected in series, of which one is the measurement coil that is affected by the presence of metal, whereas the other is a reference coil and is preferably arranged at a distance from the measurement coil. If both coils are fed by two sinusoidal or square signals that are offset from one another by 180 degrees, then with coil parameters that are exactly alike the signals that are fed are cancelled at the center tap of the two coils. Only when metal approaches the measurement coil changes the inductive property of the measurement coil, and then a corresponding signal can be detected at the center tap.

A further measuring method uses three coils that are mounted to be mechanically axially symmetrical, in a row one behind the other. If the middle coil is energized by an alternating current, there is formed at each of the other two coils a signal that is extinguished again if the coils are suitably connected with one another. When metal approaches one of the two outside coils, the inductive properties of this coil change such that complete cancellation does not take place, and it is possible to infer the presence or the type of metal from the signal produced. The converse shape—that is, two transmitter coils on the outside and one receiver coil on the inside—is also used.

The systems described above typically operate with sinusoidal oscillations, or with a deliberate resonance behavior, respectively, in order to enhance the sensitivity to the influence of metal. It is disadvantageous here if the excitation frequency and the resonant frequency of a receiver circuit are not in exact agreement, since it is then possible for phase or amplitude errors to arise.

It is also possible for the influence of temperature on the measuring system to have a disadvantageous effect, since in the event of a temperature influence the internal resistance of the coil wire can change, which in turn brings about a shift in the phase or the amplitude of the resonant circuit. In order to compensate for the influence of temperature on the transmitter or measurement coils, some measuring systems use their coil systems to measure the current at intervals, and from this determine the internal temperature-dependent resistance. The resistance measurement values obtained can then be used to apply a correction factor to the actual determination of metal type.

If an inductive analysis of an unknown metal is to be carried out, the measurement frequency must be selected accordingly in advance. More complex methods operate with a plurality of frequencies, which typically can be switched between, and in this case efficient compensation for temperature is particularly difficult.

Using the inductive systems described above, it is also possible to measure film thicknesses on a known metal. The film thickness means that a spacing between the metal surface and the coil system changes the amplitude and phase of the measured excitation signal in the receiver circuit. For this too, good compensation for temperature must be achieved in the measuring system.

Other methods (CA 2 951 848 A1) transmit a square pulse into a transmitter coil and, once the pulse has been switched off, measure the inductive response of the metal to be detected or analyzed using the transmitter coil or a further coil.

Typically, therefore, in inductive measuring systems one or more coils are excited with sinusoidal or square signals of a particular frequency, or with a single square pulse, in order to use the inductive effect of metal on these excited coil systems to render measurable a change in the amplitude and/or phase at one of the excited coils, or at separate detecting coils that are mounted specially for the purpose of detecting the emitted alternating magnetic field.

In all these inductive analysis or detection systems, changes in temperature can have an unwanted influence on the inductive properties of the emitter or receiver coil systems, with the result that many systems are equipped with temperature compensation methods.

BRIEF SUMMARY

The disclosure provides an inductive analysis or detection method in which influences of temperature on the coil system have no effect at all, and that moreover make it possible to perform spectral analysis of the inductive properties of the metal to be analyzed, in a broad frequency range.

Furthermore, such a measuring system is to be usable for analyzing the metal material, the material composition (multiple layer arrangement/multiple metal sheets), the material thickness (measurement of thickness of metal sheets), the film thickness determination (spacing between the coil system and the metal), the detection of metal objects behind for example a metal wall (e.g. position of the coupling chain in a closed coupling housing in a motor vehicle), as a proximity sensor, etc.

In the context of spectral analysis of the inductive properties, there is apparent in the output signal of the measuring system a spectrum of individual frequencies that affect and change the output signal to a greater or lesser extent, depending on the type and properties of the metal. This information on the object to be examined may preferably be obtained by means of Fourier transforms of the output signal.

For this purpose, in a measuring arrangement for the inductive analysis of metal objects, the exciter coil is excited by means of an excitation voltage. The exciter coil is inductively coupled to the receiver coil. The output signal at the receiver coil is detected for the purpose of evaluation. The excitation voltage is supplied, as a ramped voltage signal, to a closed-loop control device, which is provided with a comparator stage and which changes the self-inductance of the coil effective at the beginning of measurement, that is to say at the moment of ramping up—wherein this self-inductance in fact counters the production of a magnetic field—at the coil input such that exactly the predetermined ramp shape of the excitation voltage is applied to a resistor at the feed point of the coil. In this way, devices for generating a ramped voltage signal are provided to specify a ramped current through the exciter coil, wherein the closed-loop control device controls the current at the feed point of the exciter coil such that a ramped excitation current is produced, the current flowing into the coil being modulated by the metal object and having the effect of changing the excitation voltage. In practice, it has been found that in this way a ramping-up magnetic field—so preferably a non-linear magnet field—is formed in the exciter coil and penetrates the object to be examined, and is modulated over time by the metal object.

Optimal results are obtained since the closed-loop control device comprises a comparator, to the first input of which the excitation voltage is applied, and to the second input of which a voltage is applied at a feed point resistor of the exciter coil.

From the output signal there can be inferred information on the type, nature and also film thicknesses and layers of the object. As a result of the type of closed-loop control by way of measuring the current at a feed point or feed point resistor, the influences of temperature on the exciter coil and hence on the magnetic field produced are also eliminated.

Preferably, the closed-loop control device controls the current at the feed point of the exciter coil such that a constantly rising excitation current is produced, wherein the influence exerted by the metal object during the ramped voltage signal for generating the excitation current influences this current as a result of closed-loop control of the current at the feed point of the exciter coil such that, from this change in voltage, it is possible to infer corresponding measurement values in relation to the metal exerting an influence. For the purpose of thermal decoupling, this item of information can be detected by way of a receiver coil. The output signal that is influenced in this way makes possible the desired analysis of the metal object, extending deep into the metal object.

It has proved advantageous here that the type of metal of the metal object is the influence that changes the strength of the excitation current during the period in which the magnetic field increases, in a manner temporally dependent on the depth of penetration. As a result, it is possible to infer both the composition of alloys and also the layer structure of metal objects.

Preferably, the devices for generating a ramped voltage signal of the excitation voltage generate, at the beginning of the ramping up, at first an increase in the excitation voltage that is steep by comparison with the ramping up. This ensures, when the exciter coil is energized, that a ramped excitation current that results in the establishment of a magnetic field that is non-linear under the influence of metal is indeed produced.

Preferably, the receiver coil is arranged adjacent to and/or parallel to the exciter coil. It is likewise possible for the receiver coil and the exciter coil to be double-wound. This makes possible a space-saving construction of the coil arrangement without impairing the analysis.

In order also to ensure temperature stability of the exciter coil, preferably the output signal at the receiver coil is detected at a high impedance.

According to the method, the same advantages are produced if, for the purpose of inductive analysis of metal objects, the at least one exciter coil, which is excitable by means of an excitation voltage, is energized and an output signal of the measuring arrangement is evaluated for the purpose of analyzing the metal objects. By supplying an excitation voltage that is subjected to closed-loop control as a substantially ramped voltage signal of the excitation voltage to the exciter coil, and by controlling, by closed-loop control, the current at the feed point or feed point resistor of the exciter coil such that a ramped excitation current is indeed produced but has been modulated by energy absorption by the metal object and hence results in a discrepancy between the excitation voltage subjected to closed-loop control and the predetermined ideal ramp shape, it becomes possible for the ramping-up magnetic field to penetrate the object, making analysis of the frequency spectrum from the receiver coil possible for the purpose of analyzing the object. Optimal results are obtained since the closed-loop control device comprises a comparator, to the first input of which the excitation voltage is applied, and to the second input of which a voltage is applied at a feed point resistor of the exciter coil.

Preferably, the current at the feed point of the exciter coil is subjected to closed-loop control, by comparing the voltage at the feed point with the predetermined ramp voltage through a deviation in the excitation voltage from the ideal ramp shape, such that a constantly increasing excitation current is produced. Here, the effect of the metal object during the ramping-up voltage signal for generating the excitation current influences this current as a result of the closed-loop control of the current at the feed point of the exciter coil, such that, from this change in voltage, it is possible to infer corresponding measurement values in relation to the metal exerting an influence. For the purpose of thermal decoupling, this item of information can be detected by way of a receiver coil. The output signal from the receiver coil that is influenced in this way makes possible the desired analysis of the metal object, extending deep into the metal object.

Preferably, the closed-loop control device controls the current at the feed point of the exciter coil such that a constantly increasing excitation current is produced. The output signal that is influenced in this way makes possible the desired analysis of the metal object, extending deep into the metal object.

Advantageously, the strength of the excitation current is changed by the type of metal of the metal object. As a result, it is possible clearly to infer both the composition of alloys and also the layer structure of metal objects.

Preferably, at the beginning of the ramped voltage signal of the excitation voltage, at first an increase in the excitation voltage that is steep by comparison with the ramping up is supplied to the exciter coil. This ensures, when the exciter coil is energized, that a ramped excitation current that results in the establishment of a non-linear magnetic field is indeed produced.

Preferably, the receiver coil is arranged adjacent to and/or parallel to the exciter coil. It is likewise possible for the receiver coil and the exciter coil to be double-wound. This makes possible a space-saving construction of the coil arrangement without impairing the analysis.

In order also to ensure temperature stability of the receiver coil, according to the method preferably the output signal at the receiver coil is detected at a high impedance.

BRIEF DESCRIPTION OF THE FIGURES

The disclosure is explained in more detail below with reference to exemplary embodiments represented in the attached Figures, in which.

DETAILED DESCRIPTION

The disclosure is now explained in more detail by way of example, with reference to the attached drawings. However, the exemplary embodiments are only examples, which are not intended to restrict the inventive concept to a particular arrangement. Before the disclosure is described in detail it should be pointed out that it is not restricted to the respective structural parts of the device and the respective method steps, since these structural parts and method may vary. The terms used here are merely intended to describe particular embodiments and are not used restrictively. Moreover, where the singular or the indefinite article is used in the description or the claims, this also refers to a plurality of these elements unless the overall context unambiguously indicates otherwise.

The actual inductive measuring system comprises a very simple coil arrangement, with the electronic equipment composed of only a few components by comparison with the known measuring methods.

Figure 1:
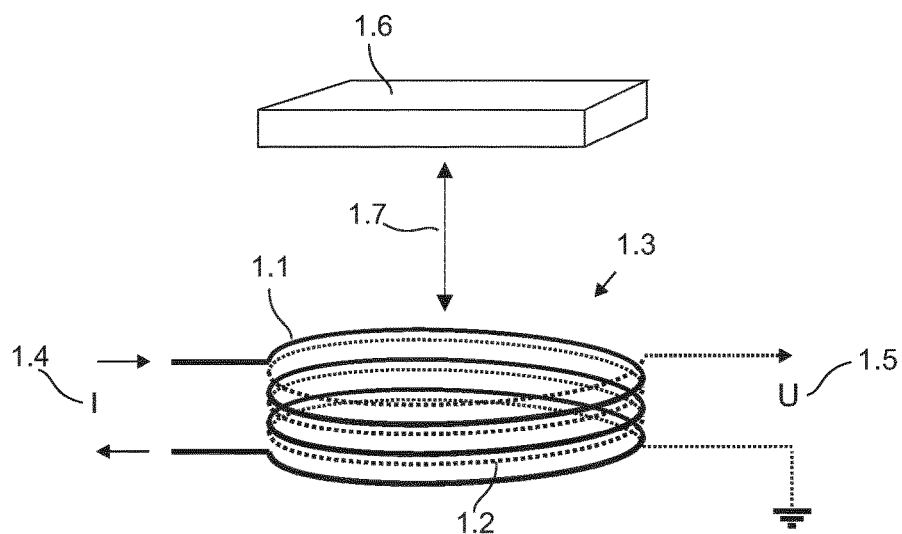
FIG. 1 shows a coil arrangement of a measuring system according to the disclosure.

The coil arrangement of the measuring system 1.3 according to FIG. 1 comprises at least two coils, which are preferably oriented plane-parallel. Here, one of the two coils acts as the exciter coil 1.1 and the other as the receiver coil 1.2. In the exemplary embodiment, the coil arrangement 1.3 comprises respectively an exciter coil 1.1 and a receiver coil 1.2, but it is also possible to use a plurality of exciter and receiver coils.

In the simplest case, the coil system comprises a winding body having two double-wound coils. This means that there is no need for any spacing between the exciter coil 1.1 and the receiver coil 1.2. Coil arrangements in which the receiver coil 1.2 and the exciter coil 1.1 are arranged directly next to one another or indeed inside one another are also possible. It is also possible for the exciter coil 1.1 and the receiver coil 1.2 to have a different number of windings. Preferably, the exciter coil has fewer windings, with a greater wire thickness, than the receiver coil.

Figure 2:
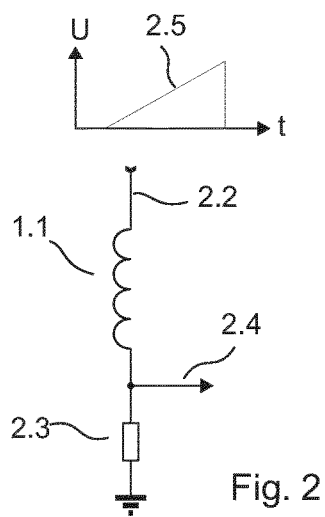
FIG. 2 shows a circuit for feeding an excitation voltage to an exciter coil.

In contrast to conventional inductive measuring systems, the exciter coil 1.1 is not excited by a sinusoidal or square signal or a square pulse, but by a direct current which increases evenly, preferably starting from zero, in the form of a ramp, represented by the course of the curve of the excitation voltage 2.5 in FIG. 2. In principle, it may be sufficient for analysis of the metal object to take one measurement. This may be repeated periodically if continuous measurement is desired.

Thus, the coil arrangement 1.3 exerts a magnetically induced interaction on the metal object 1.6.

Figure 4:
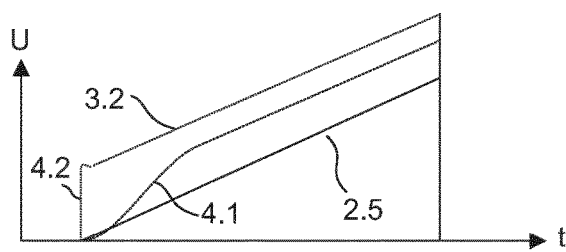
FIG. 4 shows the course of the voltage as it ramps up over time.

Assuming that the ramped excitation voltage 2.5 is applied directly to the infeed terminal 2.2 of the exciter coil 1.1, then because of the self-inductance the current through the exciter coil does not follow the voltage curve of the excitation voltage 2.5 immediately but with a time offset. This becomes clear if there is inserted at the feed point of the exciter coil 1.1 a feed point resistor 2.3 at which the exciter coil current resulting from the voltage 2.4 produced is measured. FIG. 4 illustrates this. The curve of the excitation voltage 2.5 corresponds to the ramped voltage increase at the infeed terminal 2.2, and the curve 4.1 shows the resulting current, measured as the voltage value at the feed point resistor 2.3. (For the sake of clarity, the voltages at the exciter coil and the receiver coil are not shown in proportion.)

Figure 3:
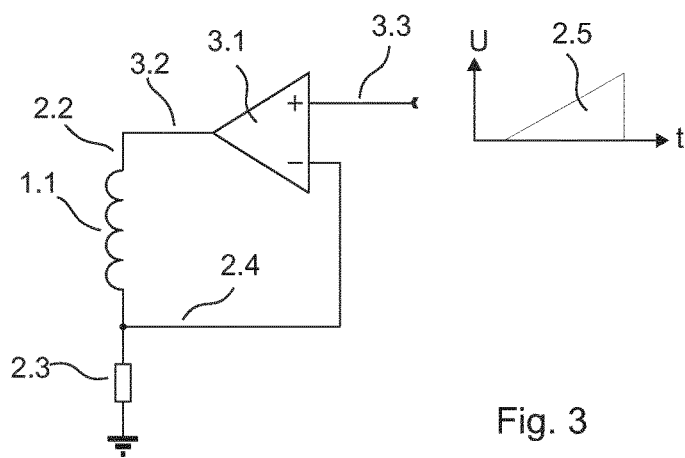
FIG. 3 shows an alternative circuit for generating a ramped current.

So that the excitation current follows the predetermined course of the curve of the excitation voltage 2.5 exactly, the circuit is supplemented as shown in FIG. 3: the excitation voltage 2.5 is supplied to the non-inverting input 3.3 of an operational amplifier (comparator) 3.1. The output of this feeds the infeed terminal 2.2 of the exciter coil 1.1. Furthermore, the inverting input is connected to the feed point resistor 2.3 and receives the voltage 2.4 from the feed point resistor 2.3. As a result of this measure, the excitation current is subjected to active closed-loop control, and so corresponds exactly to the course of the curve of the excitation voltage 2.5.

In this way, devices for generating a ramped voltage signal of the excitation voltage 2.5 are provided to specify a ramped current through the exciter coil 1.1. The closed-loop control device described controls the current at the feed point of the exciter coil 1.1 such that a ramped excitation current is produced, which is modulated by the metal object 1.6 and takes effect as a change in the excitation voltage.

Preferably, the closed-loop control device controls the current at the feed point of the exciter coil 1.1 such that a constantly increasing excitation current is produced in the feed point resistor, wherein the influence exerted by the metal object 1.6 during the ramping up of the excitation current changes the strength of the excitation current. In particular, this influence is based on the type of metal of the metal object, a point that is discussed in more detail below.

Close consideration of the influence of the closed-loop control device in FIG. 4 shows that the devices for generating a ramped voltage signal of the excitation voltage 2.5 at the beginning of the ramping up at first generate an increase 4.2 in the excitation voltage that is steep by comparison with the ramping up.

The voltage 3.2 that is produced as a result at the infeed terminal 2.2 at first rises steeply, preferably at the beginning of the ramp, then to pass into the linear range and follow the pre-set course of the curve of the excitation voltage 2.5. As a result, in a preferred embodiment, the voltage at the feed point resistor 2.3 follows exactly the course of the curve of the predetermined excitation voltage 2.5. The rise in voltage 4.2 counters the self-inductance of the exciter coil 1.1 and thus results in a linear rise in the coil current. This results in a gradual build-up of the magnetic field, which penetrates the metal object 1.6.

Because of this measure, however, the influences of temperature on the exciter coil 1.1, which are reflected in a change in the ohmic impedance of the winding and thus the inductivity or quality of the coil, are also eliminated, since the excitation current directly follows the predetermined voltage curve of the excitation voltage 2.5. This is true even if the course of the curve of the excitation voltage 2.5 is not selected to be linear and/or if it is deliberately changed in order for example to mask a metal. Because the current through the exciter coil 1.1 determines the magnetic field, as a result of the measure described above this magnetic field is no longer influenced by temperature.

In contrast to conventional inductive analysis systems, in which a decoupling of the transmitter and receiver coil is typically desired, the receiver coil 1.2 is mounted in the immediate vicinity of the exciter coil 1.1. A double-wound arrangement according to FIG. 1, with its "hard" coupling, may also be used. It is also possible for the receiver coil 1.2 and the exciter coil 1.1 to use a common ferrite core, preferably a pot core that is closed at one end.

Figure 6:
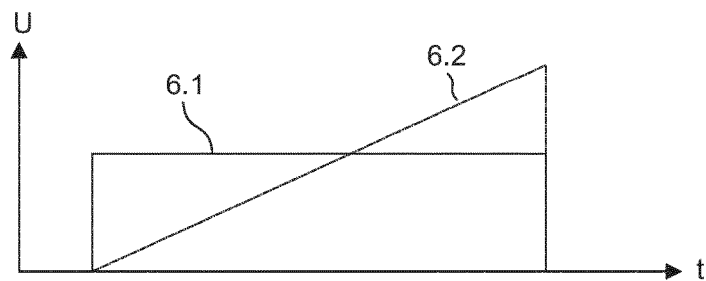
FIG. 6 shows the course of the voltage at the exciter coil, and the current at the feed point resistor, over time.

If the exciter coil 1.1 is provided with a ramped current 6.2, as produced at the feed point resistor 2.3 as a result of the predetermined excitation voltage 2.5, then a purely direct-current voltage 6.1 is formed in the exciter coil 1.2 according to FIG. 6 for the time in which ramping up occurs. The change in this direct-current voltage can then be evaluated in the time period during which a metal approaches or when a coil arrangement is laid on the metal object.

Complete insensitivity to temperature is achieved when no current flows in the receiver coil 1.2. This means that if the one end of the receiver coil 1.2 is grounded, the voltage produced is only detected at a very high impedance at the other end.

Preferably, the input impedance of the downstream circuit should be in the megaohm range. This ensures that only negligible current flows in the receiver coil 1.2, and so no influence can be exerted by a change in the resistance of the winding wire that is caused by temperature. The input of a circuit of this kind may be for example a FET input of an operational amplifier that exerts a load of only a few pA on the receiver coil 1.2.

Figure 5:
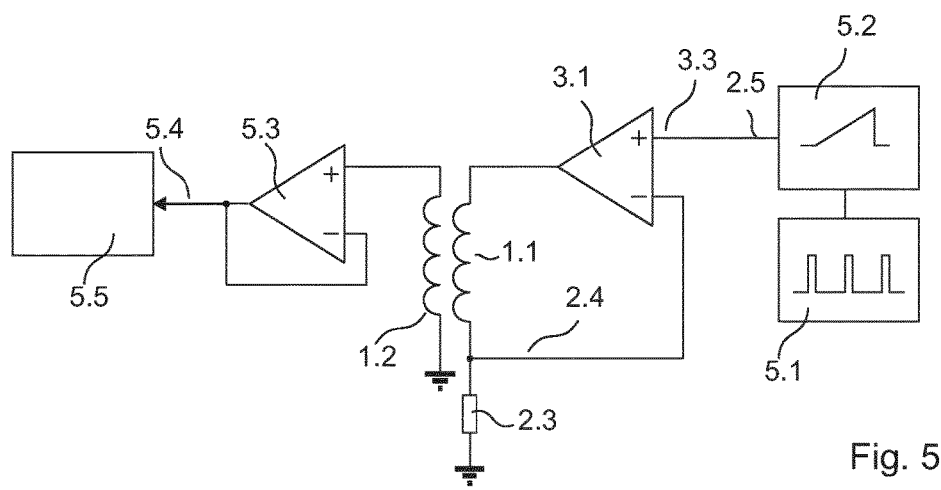
FIG. 5 shows a circuit with an integrated coil arrangement according to the disclosure.

FIG. 5 shows a possible implementation of the measuring method described here. A clock generator 5.1 delivers a starting clock pulse, for example every 100 ms, for the ramp generator 5.2. On each starting clock pulse, the ramp generator 5.2 is triggered and delivers the ramped signal, which lasts for example for 20 ms, as an excitation voltage to the comparator 3.1, which ensures that a current in accordance with the excitation voltage flows through the exciter coil 1.1. Circuits that generate a ramped signal are known to those skilled in the art, so they are not discussed in any more detail here.

It is also possible to connect power transistors downstream of the comparator 3.1 in order to generate a high ramped current. Furthermore, the impedance inverter 5.3 may be connected to the circuit as an amplifier. However, with a suitable ramped current and an appropriate number of windings, the evaluable voltage at the receiver coil can be a few volts, with the result that there is no need for further amplification.

The courses of the curves discussed below, according to FIG. 7, were determined from practice, with the following circuit variant: coils 1.1 and 1.2 each with 100 windings, double-wound, coil former D=10 mm, ferrite pot core. The maximum ramped current was 200 mA. The voltage 6.1 at the receiver coil 1.2 had a value of 1.8 Vpp in the absence of any influence from metal.

Ramping lasted for 15 ms, which when recalculated for a sinusoidal oscillation would correspond to approximately 67 Hz as the lowest frequency. The maximum frequency, calculated from the ramping-up rate of the signal 6.1, corresponded to approximately 200 kHz. In this way, the complete frequency range from 67 Hz to 200 kHz was covered in a single measurement.

The spacing between the coil arrangement and the metal surface was 1 mm. Thus, the coil arrangement is in fact almost laid on the metal object 1.6, which is preferably also typically the case when the measuring arrangement is used.

When there is an influence from metal on the coil arrangement 1.3 of the measuring system, the course of the amplitude of the output signal 5.4—that is to say of the curve 6.1 shown in FIG. 6—changes. Whereas in the absence of any influence from metal it is strictly linear and has the character of a direct-current voltage, it deviates from the curve shown at predetermined points, depending on the type of metal or the composition of different metals.

Figure 7:
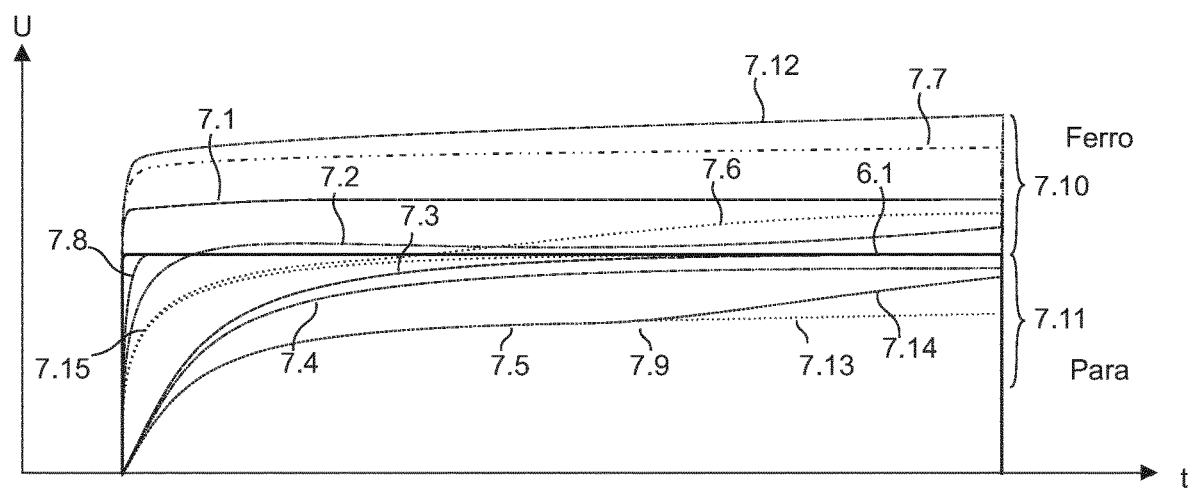
FIG. 7 shows various courses of the voltage of the output signal of the measuring system over time, with different types and compositions of metal.

FIG. 7 illustrates this. The curve 6.1 shown in a solid line in FIG. 7 shows the output signal 5.4 in the absence of any influence from metal. Deviations from the value 6.1 towards higher voltages indicate ferromagnetic materials, shown in the region 7.10. Paramagnetic and diamagnetic materials change the voltage of the curve 6.1 towards lower values, shown in the region 7.11.

The essential information on ferromagnetic materials thus resides substantially in the size of the voltage of the output signal 5.4 at low frequencies—that is to say at the end of the curve—and to a somewhat lesser extent in the rise in the signal and the further course of the curve. The curve 7.1 shows the course with an iron sheet 0.5 mm thick, the curve 7.7 shows that with an iron sheet 2 mm thick, and the curve 7.12 shows that with an iron sheet 20 mm thick.

Paramagnetic and diamagnetic materials display their magnetic interaction in particular in the region of high-frequency portions—that is to say in the region in which the signal rises—whereas in the region of low frequencies they approximate to the value of the curve 6.1 (measurement value in the absence of any influence from metal).

Below, the appearance of some curves that are produced with different flat materials (metal sheets) is explained.

A gold foil 50 μm thick changes the rise in the signal only in the region of very high frequencies, shown in curve 7.8.

Similar aluminum sheets that are 1 mm thick but of which one is provided with a coating film 50μ thick produce markedly different curves in a specific frequency range (7.15).

Sandwich constructions of different metal sheets may result for example in a curve course according to 7.2.

Depending on the thickness of the metal sheet, the rise in the curve undergoes a "delay": thus, it occurs later with thick sheets than with thin ones. The curve 7.3 corresponds to aluminum that is 3 mm thick, the curve 7.4 to aluminum 5 mm thick, and the curve 7.5 and the continuation in 7.13 to aluminum 10 mm thick.

This presentation of the curves also allows a particular feature of the disclosure to be discussed. The curve 7.5, together with the continuation of the curve shown in the dotted line 7.13, corresponds to the course of the curve with an aluminum sheet 10 mm thick. However, if there is, behind this primary aluminum sheet 10 mm thick, a secondary ferromagnetic material, then beyond a point in time 7.9 determined by the thickness of the primary material the curve kinks away, as shown in the changed curve 7.14. The thicker the primary non-ferromagnetic material, the later the change in the curve occurs. Apart from this, the output signal can be subjected to a Fourier analysis in order to obtain further material-specific information.

In the absence of any influence from metal, during the ramping up the output signal 5.4 substantially resembles a direct-current voltage. A change in the output signal contains the information on the type, nature and thickness of the metal which can preferably be obtained by means of Fourier analysis.

The shape of the ramp and hence also a shape of the ramp that is changed by a metal in the surrounding area is modifiable, in order to mask metals in the surrounding area.

The curves that are produced with a specific metal or mix of metals can be stored for example in a database and, by comparing them with the stored curves, the unknown material to be analyzed can then be identified or defined.

At the same time, using this measuring method it is of course also possible to examine materials for specific changes in their crystalline structure as a result of stress (compression, elongation), or to detect hairline cracks or material defects.

Figure 8:
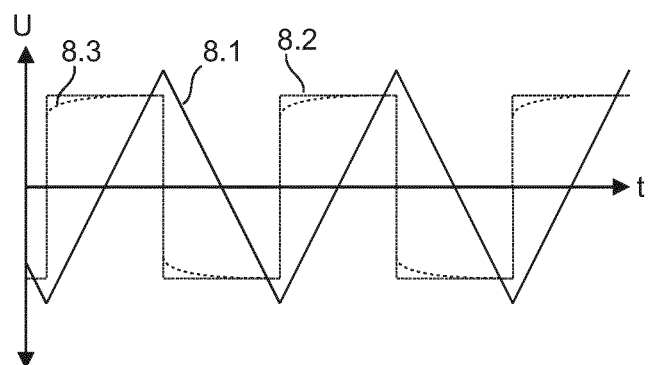
FIG. 8 shows the alternative rising and falling course of a ramped excitation signal and an associated output signal.

In a further embodiment, the excitation current may also follow a continuous rising and falling ramped signal 8.1, according to FIG. 8. The output signal 5.4 then adopts positive and negative values, as shown by curve 8.2 in FIG. 8, or under the influence of a metal has the same change in the course of the curve 8.3 as there is with an individual ramp, but additionally mirrored in the negative range. This configuration is particularly suitable if rapid changes in the type of metal or rapid changes in position are to be detected.

Figure 9:
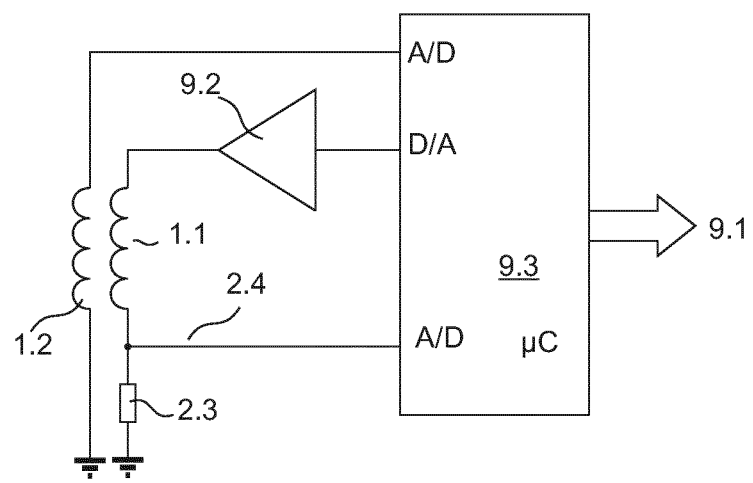
FIG. 9 shows an alternative embodiment of the measuring system, using a microcontroller.

When the excitation signal and receiver signal are controlled and evaluated using a microcontroller 9.3 according to FIG. 9, the form taken by the measuring system is particularly simple, since substantially only one current driver 9.2 and one feed point resistor 2.3 are required in order to enable a stable-temperature, inexpensive analytical method for the most diverse tasks, such as measuring film thickness, recognizing double sheets of metal, analyzing multiple layers, determining material, etc. The microcontroller 9.3 may have a communication channel 9.1 to a display or evaluation unit, in order for example to compare the measured values with a database or for example to present them directly on a display.

There is thus provided a system for the measurement of the inductive properties of any desired metal object 1.6, wherein the influences of temperature on the coil system and the measurement have no effect. Even so, with one measurement the system covers a broad spectral range of for example 50 Hz-200 kHz, for which it requires only a small expense in terms of electronics.

The large penetration depth should be emphasized, in particular with ramped currents that are ramped up slowly, for example for >100 ms. Using Fourier analysis of the output signal 5.4, it was possible, for example with a pot core coil arrangement 10 mm in diameter, to determine three layers, arranged one above the other in any desired manner, of different sheet metals (brass, aluminum, copper, bronze, etc.) each 1 to 2 mm thick—both in terms of the order in which they occur and the individual sheet thicknesses. This makes it clear that the measuring arrangement and the method are also suitable for a depth analysis or for measuring sheet thickness. Using a flat coil arrangement with no ferrite core that is 50 mm in diameter, it is possible for example to examine non-ferrous metals to a depth of over 30 mm.

It goes without saying that this description may be subject to the most diverse modifications, changes and adaptations which are within the range of equivalents to the attached claims.

The invention claimed is:

1. A measuring arrangement, configured for the inductive analysis of metal objects, comprising a coil arrangement comprising at least one exciter coil, which is excitable by means of an excitation voltage, and at least one receiver coil, which are inductively coupled to one another, electronics equipment for energizing the exciter coil and an evaluation unit for evaluating an output signal of the measuring arrangement, which output signal is detected by the receiver coil, a ramp generator for generating a ramped voltage signal of the excitation voltage to specify a ramped current through the exciter coil, a closed-loop control comprising an operational amplifier or comparator, to the first input of which the excitation voltage is applied, and to the second input of which the excitation voltage is applied at a feed point resistor arranged at a feed point of the exciter coil, wherein the closed-loop control is configured to control the current at the feed point of the exciter coil such that a ramped excitation current is produced, which is modulatable in time by the metal object in changing the excitation voltage, wherein the evaluation unit is configured to evaluate the output signal of the measuring arrangement in using spectral analysis of inductive properties of the metal object to be analyzed in a frequency range.

2. A measuring arrangement according to claim 1, wherein the closed-loop control is configured to control the current at the feed point of the exciter coil such that a constantly rising excitation current is produced, wherein a strength of the excitation current is changeable by an influence exerted by the metal object during a ramping up of the excitation current.

3. A measuring arrangement according to claim 2, wherein the strength of the excitation current is changeable by a type of metal of the metal object.

4. A measuring arrangement according to claim 1, wherein the ramp generator for generating the ramped voltage signal of the excitation voltage is configured to generate, at the beginning of the ramping up, at first an increase in the excitation voltage that is steep by comparison with the ramping up, for the purpose of overcoming the self-inductance of the exciter coil that counters the magnetic field.

5. A measuring arrangement according to claim 1, wherein the receiver coil is arranged adjacent to and/or parallel to the exciter coil.

6. A measuring arrangement according to claim 1, wherein the output signal at the receiver coil is detected at a high impedance.

7. A method for the inductive analysis of metal objects, comprising a measuring arrangement with a coil arrangement comprising at least one exciter coil, which is excitable by means of an excitation voltage, and at least one receiver coil, which are inductively coupled to one another, the method comprising:

energizing the exciter coil and an output signal of the measuring arrangement, which output signal is detected by the receiver coil, and is evaluated for the purpose of analyzing the metal objects, supplying a ramped voltage signal of the excitation voltage to specify a ramped current through the exciter coil, applying a closed-loop control, comprising an operational amplifier or comparator, to the first input of which the excitation voltage, and to the second input of which the excitation voltage at a feed point resistor of the exciter coil, controlling a current through the exciter coil at a feed point of the exciter coil such that a ramped excitation current is produced at the feed point resistor, wherein the current flowing in the exciter coil is modulatable by the metal object in changing the excitation voltage, and evaluating the output signal of the measuring arrangement in conducting a spectral analysis of inductive properties of the metal object to be analyzed in a frequency range.

8. A method according to claim 7, wherein the current at the feed point of the exciter coil is subjected to closed-loop control such that a constantly increasing excitation current is produced, a strength of which is changeable by an influence exerted by the metal object during a ramping up of the excitation current.

9. A method according to claim 8, wherein the strength of the excitation current is changeable by a type of metal of the metal object.

10. A method according to claim 8, wherein, at the beginning of the ramped voltage signal of the excitation voltage, at first there is an increase in the voltage at the exciter coil that is steep by comparison with the ramping up.

11. A method according to claim 7, wherein the receiver coil is arranged adjacent to and/or parallel to the exciter coil.

12. A method according to claim 7, wherein the output signal at the receiver coil is detected at a high impedance.

* * * * *